(12) United States Patent
Wagner

(10) Patent No.: US 6,302,776 B1
(45) Date of Patent: Oct. 16, 2001

(54) CASING LOCK MECHANISM FOR A SAUSAGE STUFFING MACHINE

(75) Inventor: Richard C. Wagner, Frankfurt, IL (US)

(73) Assignee: Hollymatic Corporation, Countryside, IL (US)

( * ) Notice: Subject to any disclaimer, the term of this patent is extended or adjusted under 35 U.S.C. 154(b) by 0 days.

(21) Appl. No.: 09/605,972

(22) Filed: Jun. 29, 2000

(51) Int. Cl.$^7$ ................................................. A22C 11/10
(52) U.S. Cl. ................................................. 452/45; 452/47
(58) Field of Search ...................... 452/47, 45, 21, 452/22, 32, 35

(56) References Cited

U.S. PATENT DOCUMENTS

| | | |
|---|---|---|
| 3,964,128 | 6/1976 | Townsend et al. . |
| 4,073,039 * | 2/1978 | Muller et al. ............... 452/47 |
| 4,437,209 * | 3/1984 | Duroyon ...................... 452/32 |
| 4,570,301 * | 2/1986 | Beckman et al. ............ 452/45 |
| 4,583,264 | 4/1986 | Nausedas . |
| 4,606,379 * | 8/1986 | Nausedas ..................... 452/45 |
| 4,627,130 | 12/1986 | Nausedas et al. . |
| 5,013,279 * | 5/1991 | Southworth ................. 452/45 |
| 5,064,401 | 11/1991 | Kasai et al. ................. 452/46 |
| 5,092,813 | 3/1992 | Kasai et al. ................. 452/46 |
| 5,180,327 | 1/1993 | Kasai et al. ................. 452/47 |
| 5,197,914 * | 3/1993 | Powers ....................... 452/32 |
| 5,199,921 | 4/1993 | Townsend ................... 452/47 |

FOREIGN PATENT DOCUMENTS

68342-A * 1/1983 (EP) ........................................ 452/45

* cited by examiner

*Primary Examiner*—Willis Little
(74) *Attorney, Agent, or Firm*—Sughrue, Mion, Zinn, Macpeak & Seas, PLLC

(57) ABSTRACT

A casing lock mechanism, for a sausage stuffing machine, which reduces the risk of damage to a sausage casing during a sausage extruding operation. The casing lock mechanism includes a chuck member that holds a pair of jaws having jaw holes that surround a nozzle or stuffing horn. The chuck member is connected to the nozzle so that it rotates at the same time, in the same direction, and at the same speed as, the nozzle. The chuck member holds the jaws so that when rotated it imparts a centrifugal force to the jaws thereby causing them to move radially outward to lock a sausage casing to the outside of the nozzle. Because the nozzle does not rotate during an extruding portion of the sausage stuffing cycle, no centrifugal force is imparted to the jaws which thus assume a free state wherein they do not lock the sausage casing to the nozzle. Therefore, pressure on the sausage casing during the extruding cycle is reduced, thereby reducing the tendency to overstress and tear the sausage casing.

8 Claims, 6 Drawing Sheets

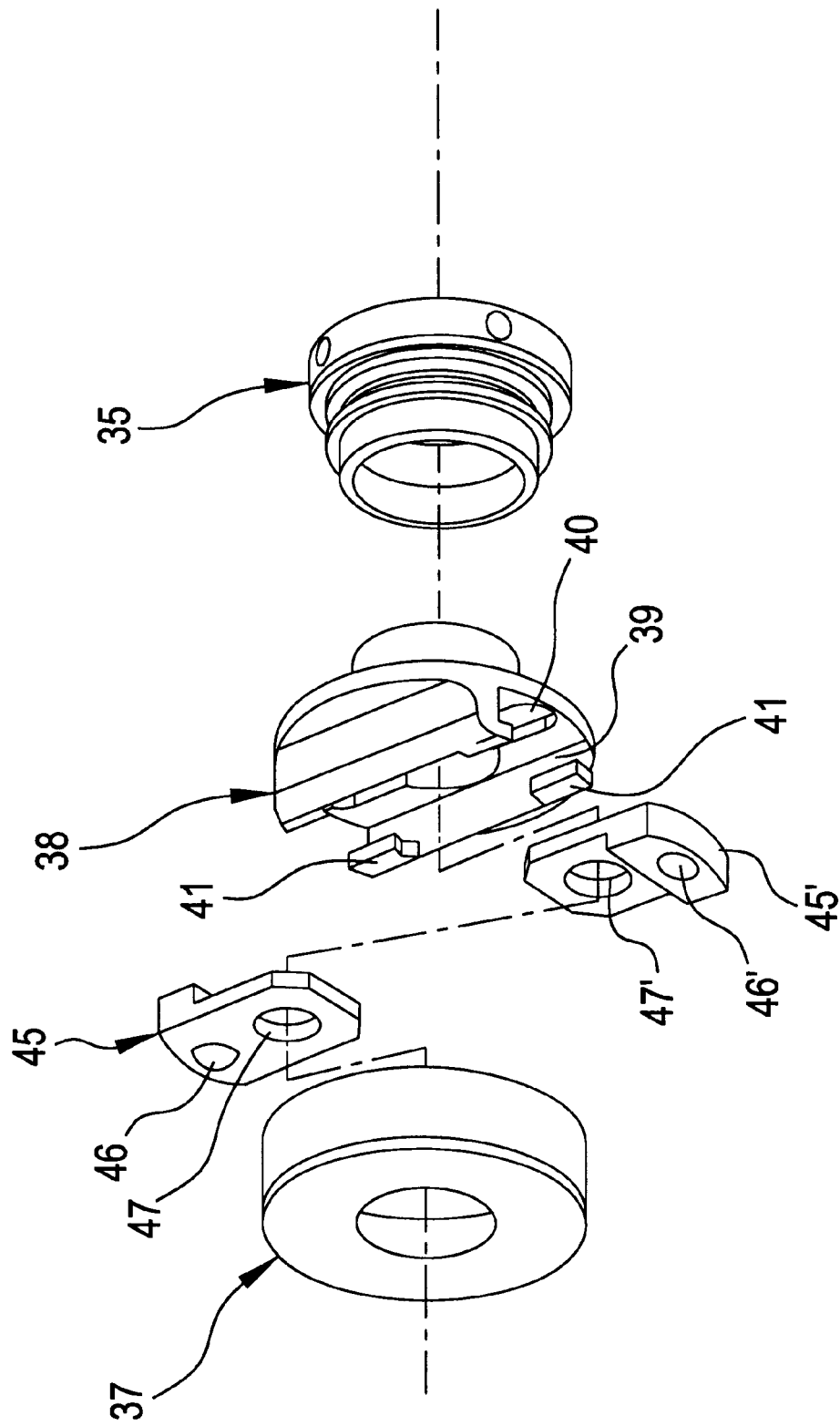

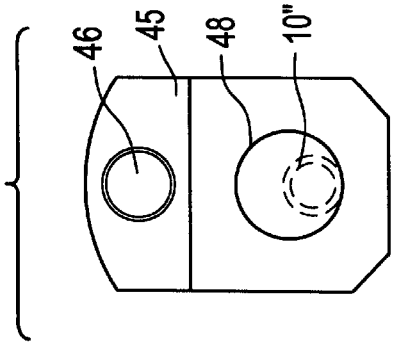
FIG. 3A
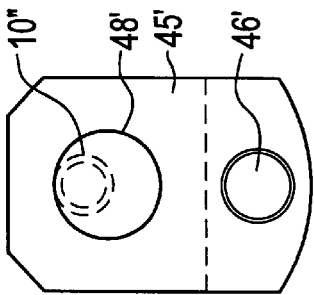
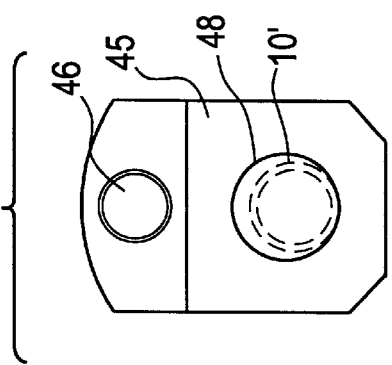
FIG. 3B
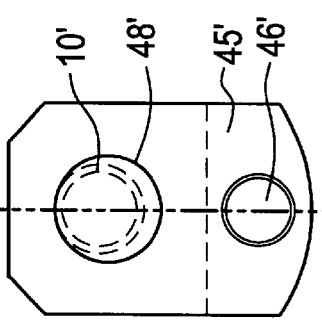
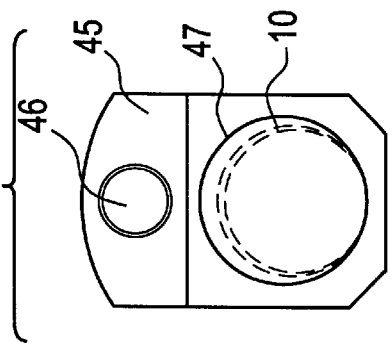
FIG. 3D
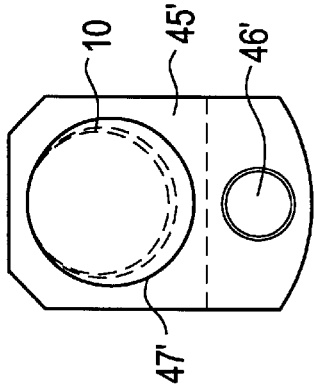
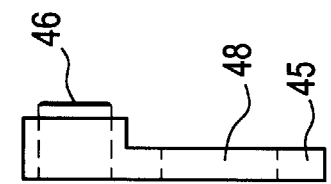
FIG. 3
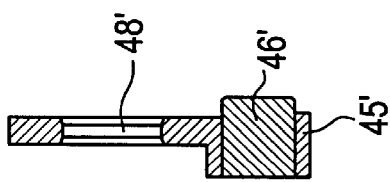
FIG. 3C

CASING LOCK MECHANISM FOR A SAUSAGE STUFFING MACHINE

BACKGROUND

1. Field of the Invention

The present invention pertains to meat encasing machines for manufacturing sausages, wieners and the like (hereinafter simply referred to as sausages). More particularly, the present invention pertains to a sausage linker mechanism for use with a sausage stuffing machine. The linker mechanism of the present invention includes an improved casing lock for holding a sausage casing to a stuffing horn during a link twisting operation, wherein the stuffing horn is rotated.

2. Related Art

Sausage stuffing machines typically have an elongated stuffing horn, or nozzle, upon which is mounted a shirred flexible casing. A chuck is mounted on the machine and receives the discharge end of the stuffing horn through which meat emulsion is extruded. The end of the stuffing horn and the shirred casing thereon are inserted through the chuck, and the assembly is rotated by a suitable drive mechanism. A linking mechanism downstream from the discharge end of the stuffing horn serves to grasp the filled casing to hold it against rotation. Thus, the opposing forces exerted on the casing by the chuck and the linking mechanism cause the casing to twist at longitudinal increments defined by the distance between the discharge end of the chuck and the point where the filled casing is grasped by the linking mechanism. If no radial pressure is applied to the sausage casing at the end of the extruding nozzle, during the link twisting operation, then the casing will not rotate with the nozzle. This results in an improper twisting of the casing along the extruding horn instead of at the point between sausage links.

One related art device has a casing lock mechanism that includes a rubber diaphragm mounted within a rotating device and around a stuffing horn or nozzle. The rotating device is driven by a belt drive to synchronize its rotation with the rotation of the nozzle during a link twisting operation. However, this type of casing lock mechanism suffers several disadvantages. First, because of part tolerances, it is difficult to maintain an even pressure between the rubber diaphragm and the sausage casing during the link twisting operation. Second, when a link twisting operation is not being carried out, as for example during an extruding part of a sausage stuffing cycle, the rubber diaphragm exerts a radial pressure against the casing thereby producing unnecessary drag on the casing. But such radial pressure and drag are not necessary at times other than during a link twisting operation and, therefore, there is a risk that the sausage casing will be torn during an extruding operation.

U.S. Pat. No. 4,583,264 to Nausedas and U.S. Pat. No. 5,199,921 to Townsend are similar to the related art sausage stuffing machine discussed above in that they both include chucks that exert a radial pressure on the sausage casing at all times during the stuffing operation, i.e., during both extruding and link twisting operations. Therefore, these patents suffer the same disadvantages as the related art sausage stuffing machine in that they produce an unnecessary drag on the sausage casing, which drag may lead to a failure of the casing.

U.S. Pat. No. 3,964,128 to Townsend attempts to reduce casing failures by providing a fin head mounted to the end of a stuffing tube, by a spring, wherein the fin head is rotatable over a limited range relative to the stuffing tube. However, Townsend's fin head includes radially extending fins which, although bendable, exert a drag on the sausage casing at all times, i.e., during both the extruding and link twisting operations. Therefore, Townsend still suffers disadvantages similar to those mentioned above in that there is an increased risk of casing failure due to the unnecessary constant outward pressure on the casing.

SUMMARY OF THE INVENTION

An object of the present invention is to overcome the disadvantages of the related art sausage stuffing machines. More particularly, it is an object of the present invention to reduce the force on a sausage casing during a sausage extruding operation, yet provide sufficient force to the casing during a twisting operation so that the casing twists along with a stuffing horn. By reducing the force on a sausage casing during a sausage extruding operation, there is a educed risk of ripping, or otherwise causing failure of, a sausage casing. In turn, reducing the risk of casing failure leads to an increased throughput of a sausage stuffing machine due to less down time. This all results in significant cost savings in a sausage making operation.

The present invention achieves the above and other objects and advantages by providing a sausage casing lock mechanism which does not constantly exert a force on the sausage casing. A belt driven chuck member rotates at the same time and rpm—570, for example—as the nozzle during the link twisting operation. A pair of jaws are located within a radial track in the chuck member. When the chuck member rotates, a centrifugal force is imparted to the jaws thereby moving them into a position wherein they exert a force which presses the casing to the nozzle. This allows the twisting action of the nozzle properly to twist the casing thereby tying a previously extruded sausage link.

Further, when rotation stop—as during the extruding cycle—the jaws are in a free state which allows the casing to move easily therethrough. That is, the casing lock of the present invention uses centrifugal force to impart a holding force between jaw members and a stuffing horn only during a link twisting operation. Because the stuffing horn and chuck member, which holds the jaws, rotate only during a link twisting operation—not during the extruding operation—centrifugal force is not exerted on the jaws during the extruding operation. Thus, when centrifugal force is not exerted on the jaws, they are in a free state wherein a reduced force is generated on the sausage casing, thereby reducing the tendency of overstressing and tearing, or otherwise causing failure of, the sausage casing.

According to another feature of the present invention, the jaws—which surround the nozzle—are supplied in sets and are readily changed to accommodate different diameters of extruding nozzles. To change jaws, a chuck assembly—which includes the chuck member and the jaws—is unlatched from a support and moved forward to clear the nozzle. Being clear of the extruding nozzle, the jaws can be moved toward the center of the chuck member, along the radial track, to a position wherein they are clear of tabs which hold them in the chuck member. New jaws are then placed in position in the chuck member, and the assembly is moved back into its operating position, wherein the jaws surround the nozzle. That is, the casing lock mechanism of the present invention can easily adapt to different sized extruding nozzles which are used to form different sized sausages. Further, to facilitate replacement of the extruding nozzle, with or without changing jaws, the chuck assembly is pivotable—after being slid forward of the nozzle—to a position away from the axis of the nozzle.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein:

FIG. 2 is an exploded perspective view of a portion of a chuck assembly of the casing lock mechanism according to the present invention;

FIG. 3 is a side view of a jaw of the casing lock mechanism according to the present invention;

FIGS. 3A–D are front and cross sectional views of a jaw of the casing lock mechanism according to the present invention, showing the interaction between the jaws and a stuffing nozzle, wherein FIG. 3A shows a front view of one embodiment of a pair of jaws with a first sized nozzle, FIG. 3B shows a front view of a second embodiment of a pair of jaws with a second sized nozzle, FIG. 3C shows a cross section—as taken along line III—III—of one of the jaws as shown in FIG. 3B, and FIG. 3D shows a front view of the jaws according to the second embodiment with a third sized nozzle;

DETAILED DESCRIPTION OF THE INVENTION

The casing lock mechanism of the present invention includes a chuck member 38 and jaws 45, 45' which are configured to operate by centrifugal force developed only during a link twisting operation and, therefore, reduce the risk of damaging a sausage casing during an extruding operation. The casing lock mechanism of the present invention will be described in connection with FIGS. 1–6, wherein FIGS. 1 and 1A–C are perspective views of the casing lock mechanism of the present invention as it is attached to a lid 1 of a sausage stuffing machine.

Figure 1:
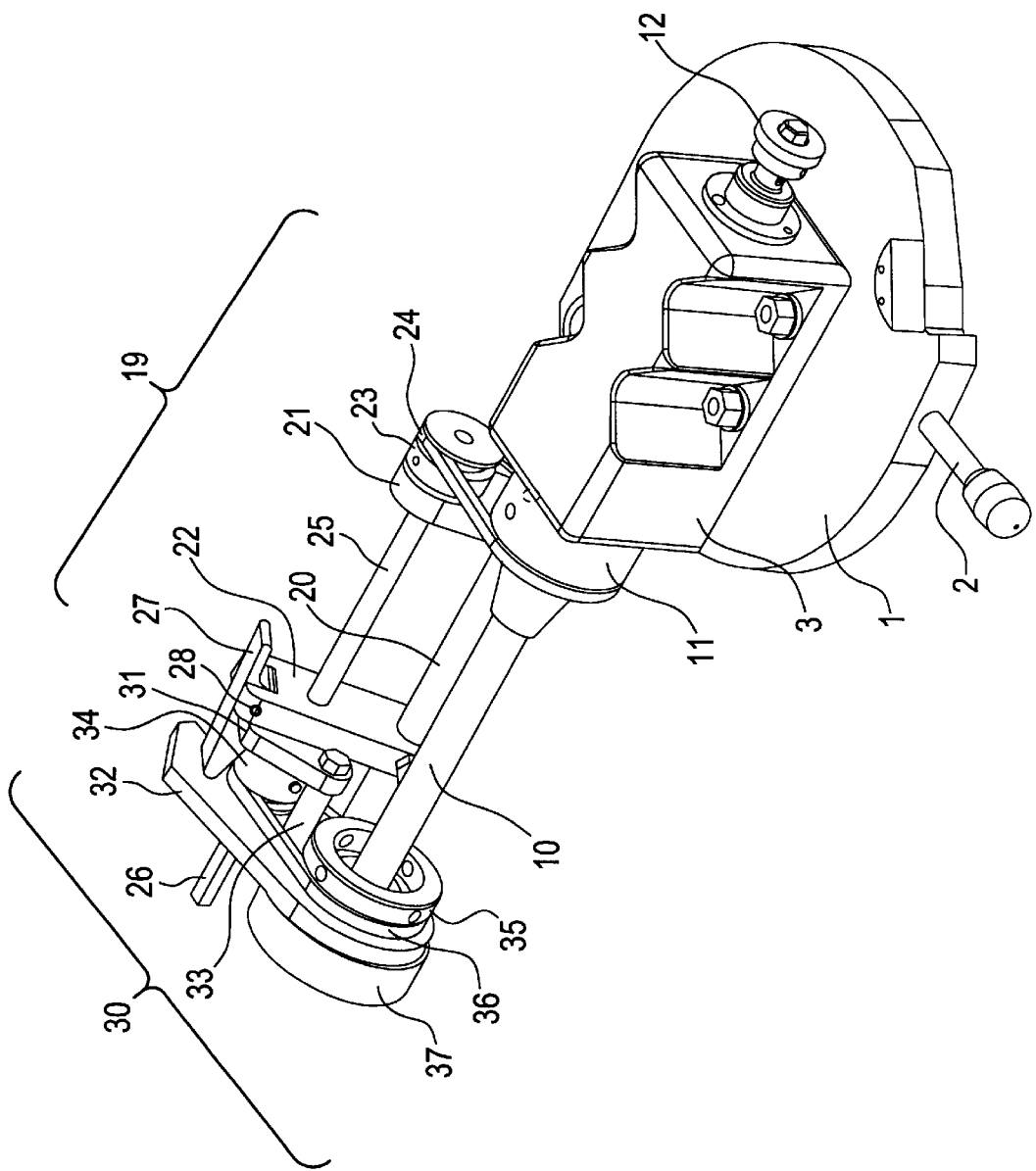
FIG. 1 is a perspective view of a casing lock mechanism of the present invention as attached to a lid of a sausage stuffing machine.
Figure 1A:
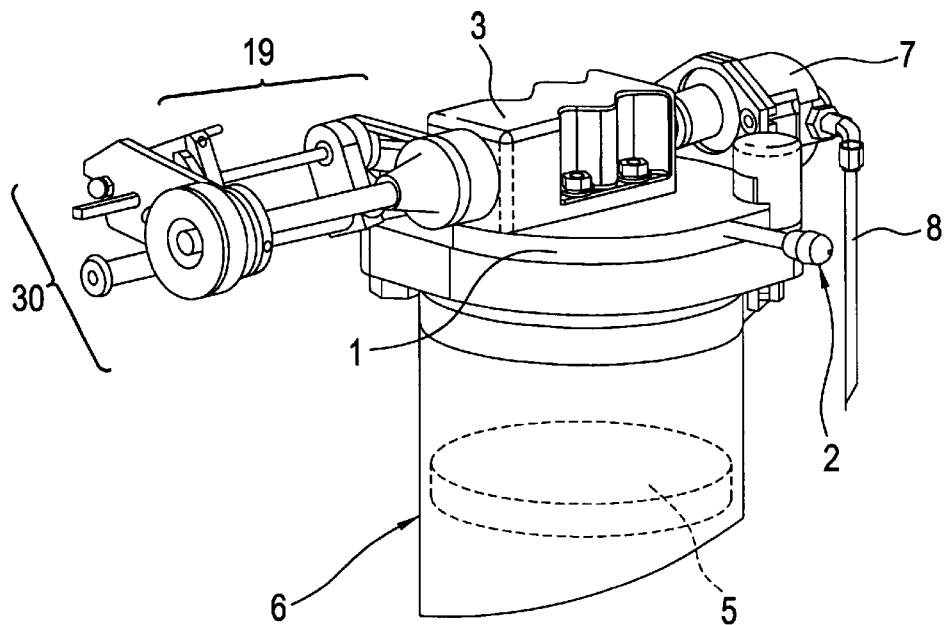
FIG. 1A is a perspective view similar to that in FIG. 1, but showing further details of the sausage stuffing machine on which the casing lock mechanism of the present invention may be attached.
Figure 1B:
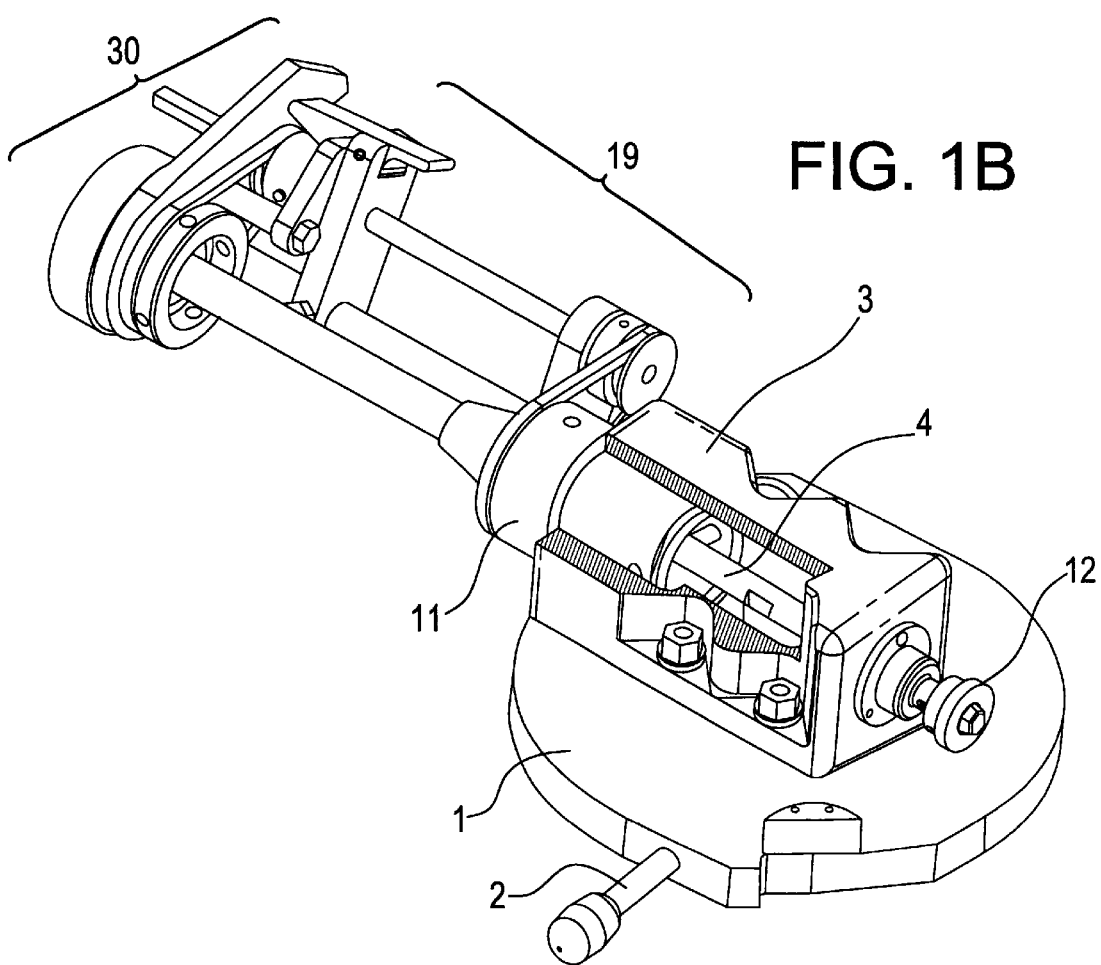
FIG. 1B is a perspective view similar to that in FIG. 1, but also showing a cut—away view of a housing on the lid of a sausage stuffing machine.

A sausage stuffing machine includes a lid 1 which is fitted over a cylinder 6, see FIG. 1A, for containing meat emulsion to be stuffed into a sausage casing. Further, the lid 1 includes a handle 2 for pivoting it off of the cylinder 6 so that the meat emulsion can be inserted into the stuffing machine. A piston 5 within the cylinder 6 then pushes the meat emulsion through the lid 1, through a housing chamber 3, and into the nozzle 10 so as to fill a sausage casing 50. During an extruding operation, the nozzle 10 does not rotate, but remains supported by the housing chamber 3 by a rod 4 to which it is attached by special nut 11. See FIG. 1B. The rod 4 extends from the rear end of the housing chamber 3, and has a coupling 12 attached to it. The coupling 12 is then attached to a motor 7 which rotates the nozzle 10 during a link twisting operation. See FIG. 1A.

In its preferred embodiment, the casing lock mechanism of the present invention is used on a sausage stuffing machine which is of the type wherein the nozzle 10 does not spin during an extruding cycle, but only spins during a link twisting cycle. This may be accomplished by, for example, using a hydraulic motor 7 to drive the coupling 12, and using a hydraulic circuit to move the piston 5 which pushes the meat emulsion through the housing chamber 3. Further, in this type of sausage stuffer, a directional control valve switches oil flow from the hydraulic cylinder which drives the piston 5, to the hydraulic line 8 and hydraulic motor 7 driving the extruding nozzle 10. Thus, an electronic timer (not shown) may control the direction control valve to selectively distribute the oil pressure. For example, two times may be set, wherein the first controls the number of revolutions of the hydraulic motor 7 to turn or twist the nozzle 10, and the second controls the time that pressure is delivered to the piston 5 thereby controlling the length of the sausage before the next link is tied. In such an arrangement, the hydraulic pressure is distributed to one or the other of the motor 7 and the piston 5 so that during the extruding cycle, only the piston 5 is operated, and during the link twisting operation, only the motor 7 is operated to turn the nozzle 10.

The casing lock of the present invention includes a supporting and driving apparatus 19, as well as a chuck assembly 30, which are shown in detail in FIG. 1. The chuck assembly can be slid away from its position surrounding nozzle 10, and pivoted away from the axis of the nozzle 10, so that the jaws 45, 45' of the chuck assembly, as well as the nozzle 10, can both be readily exchanged for different sized jaws and a different sized nozzle, respectively.

The supporting and driving apparatus 19 includes a support rod 20 which is attached to the lid 1 of the sausage stuffing machine. A first support member 21, and a second support member 22 are fixed to the support rod 20 and, therefore, are fixed relative to the lid 1 and nozzle 10. A pulley 23 is mounted to one end of a rotating rod 25 that is rotatably mounted to the support members 21, 22. On the end of the rotating rod 25 opposite the pulley 23, there is a driving portion 26 which can be keyed to a first pulley 34 in the chuck assembly to be described later. Further, the supporting and driving apparatus 19 includes a belt 24 looped around the pulley 23 and the special nut 11 so as to couple the rotation of the nozzle 10 to the rotating rod 25 which then spins relative to the first and second support members 21, 22 when the nozzle 10 is rotated. Moreover, the supporting and driving apparatus 19 includes a quick release lever 27 which is connected to the second support member 22 by a pin 28. The quick release lever 27 functions to releasably hold the chuck assembly 30 adjacent to the supporting and driving apparatus 19, and functions to releasably hold the chuck assembly 30 in a position wherein jaws 45, 45' of the chuck assembly 30 are engagable with the nozzle 10.

Figure 5:
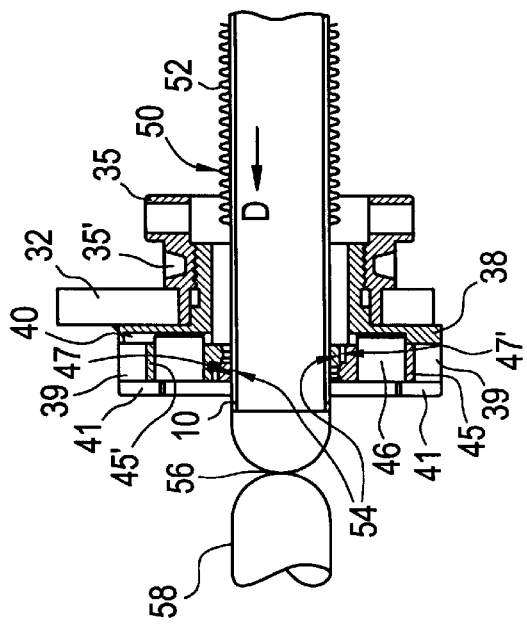
FIG. 5 is a cross section—taken along line V—V—of the nozzle and portion of the chuck assembly shown in FIG. 4.
Figure 6:
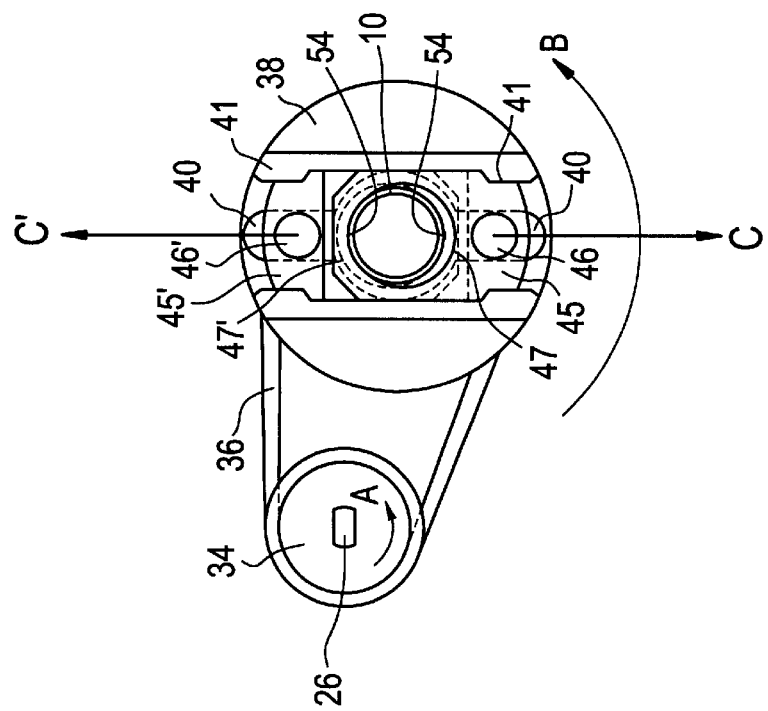
FIG. 6 is a front view of the nozzle and portion of the chuck assembly as shown in FIGS. 4 and 5.

The chuck assembly 30 includes a first support plate 31 to which a second support plate 32 is attached by support bolts 33. A first pulley 34 is rotatably mounted to the first support plate 31 at a position wherein it is between the first and second support plates 31, 32. Further, the interior of the first pulley 34 has a shape which is complementary to that of the driving portion 26 of rotating rod 25, on which the first pulley 34 is disposed. Thus, the first pulley 34 is keyed to the driving portion 26 so as to be driven thereby. See FIG. 6. A second pulley 35, having a belt groove 35' therein, see FIG. 5, is rotatably mounted to the second support plate 32. A belt 36 is disposed on the first and second pulleys 34, 35 so that the first pulley 34 drives the second pulley 35. The second pulley 35 is attached to a chuck member 38 which holds jaws 45, 45', see FIG. 2, and to a chuck cap 37 which covers the chuck member 38 and jaws 45, 45'. The diameter of the special nut 11, and the diameters of the pulleys 23, 34, 35, and the dimensions of the chuck member 38 are chosen so that the chuck member 38 spins at the same time, in the same direction, and at the same rpm as does the nozzle 10.

The chuck member 38 includes a radial track 39, and a slot 40 for receiving the jaw members 45, 45'. See FIG. 2. The radially outward ends of the radial track 39 are bounded by tabs 41 which hold the jaws 45, 45' in the radial track 39, yet allow the jaws 45, 45' to slide within the radial track 39. Further, the tabs 41 are located toward the outer circumference of the chuck member 38 so that there is a space between the tabs 41 which allows the jaw members 45, 45' to be removed from the radial track 39 when it is desired to do so. The slot 40 includes a central portion through which the nozzle 10 may be disposed, and radially extending elongated portions connected to the central portion.

The jaws 45, 45' respectively include weights 46, 46', and jaw holes 47, 47'. The weights 46, 46' extend from the rear of the jaws 45, 45', and are received with the radially elongated portions of the slot 40 in chuck member 38 to assist in retaining the jaws 45, 45' within the chuck member 38. Preferably, the main portion of the jaws 45, 45' is made of plastic to which the weights 46, 46' are attached. However, although the weights 46, 46' are shown as separate from the main portion of the jaws 45, 45', they do not necessarily need to be. The main thing is that the end of the jaws 45, 45' opposite to that including the holes 47, 47' is heavier than the end of the jaws which includes the holes 47, 47' so that the jaws 45, 45' move radially outward under a centrifugal force generated during rotation of the chuck member 38. The jaw holes 47, 47' are mounted around the nozzle 10, and may be of various sizes so as to suit the particular size of nozzle 10 being used. In fact, different jaw hole sizes and their relation to nozzle sizes, when the jaws 45, 45' are in a locking position, are shown in FIGS. 3A, B, and D.

In FIG. 3A, relatively large jaw holes 47, 47' are shown in use with a relatively large nozzle 10. In FIG. 3B, smaller jaw holes 48, 48' are used with a smaller nozzle 10', whereas those same sized jaw holes 48, 48' are used with an even smaller nozzle 10" as shown in FIG. 3D. For example, holes 47, 47' of 1 3/8 inches in diameter can be used with a 1 1/4 inch diameter nozzle 10. Further, for example, holes 48, 48' of 7/8 inch diameter can be used either with a 3/4 inch diameter nozzle 10', or with a 1/2 inch diameter nozzle 10". Additionally, although not shown, jaw holes having a diameter of 7/8 inches are suitable for use with a 7/16 inch diameter nozzle. Preferably, as shown in FIG. 3C, the edges of the jaw holes 47, 47', 48, 48' are smoothed, as by chamfering so as to allow a sausage casing to easily move through and, thereby, reduce the risk of damaging the sausage casing. Although two jaws 45, 45' are shown, and are preferred, the casing lock mechanism may be used with only one jaw. Further, although the jaw holes 47, 47, 48, 48' are preferably circular, as shown, they may be of any suitable shape so that a portion thereof engages a sausage casing to the nozzle when the jaws 45, 45' are centrifugally moved outwardly.

The jaws 45, 45' easily can be changed to accommodate differently sized nozzles 10, 10', 10" as follows. First, the quick release lever 27 is depressed so as to release first support plate 31 from engagement with the second support member 22 of the supporting and driving apparatus 19. The chuck assembly 30 and, in particular, first pulley 34 are then slid along the drive portion 26 of the rotating rod 25 so that the jaw holes 47, 47' are no longer around the nozzle 10. In this position, the chuck cap 37 is removed to access the jaws 45, 45'. Alternatively, the chuck cap 37 may be removed before releasing and sliding the chuck assembly 30. Because the jaw holes 47, 47' are no longer around the nozzle 10, they can be slid along the radial track 39 towards the center of the chuck member 38. First, the jaws 45, 45' are slid to a point wherein the tabs 41 no longer retain one of the jaws 45, 45'. At this point, that one of the jaws 45, 45' is easily removed. These steps are then repeated for the other one of the jaws 45, 45'. A process the reverse of that described above can then be followed to insert a new set of jaws into the chuck member 38, and position them for use on the sausage stuffing machine.

Figure 1C:
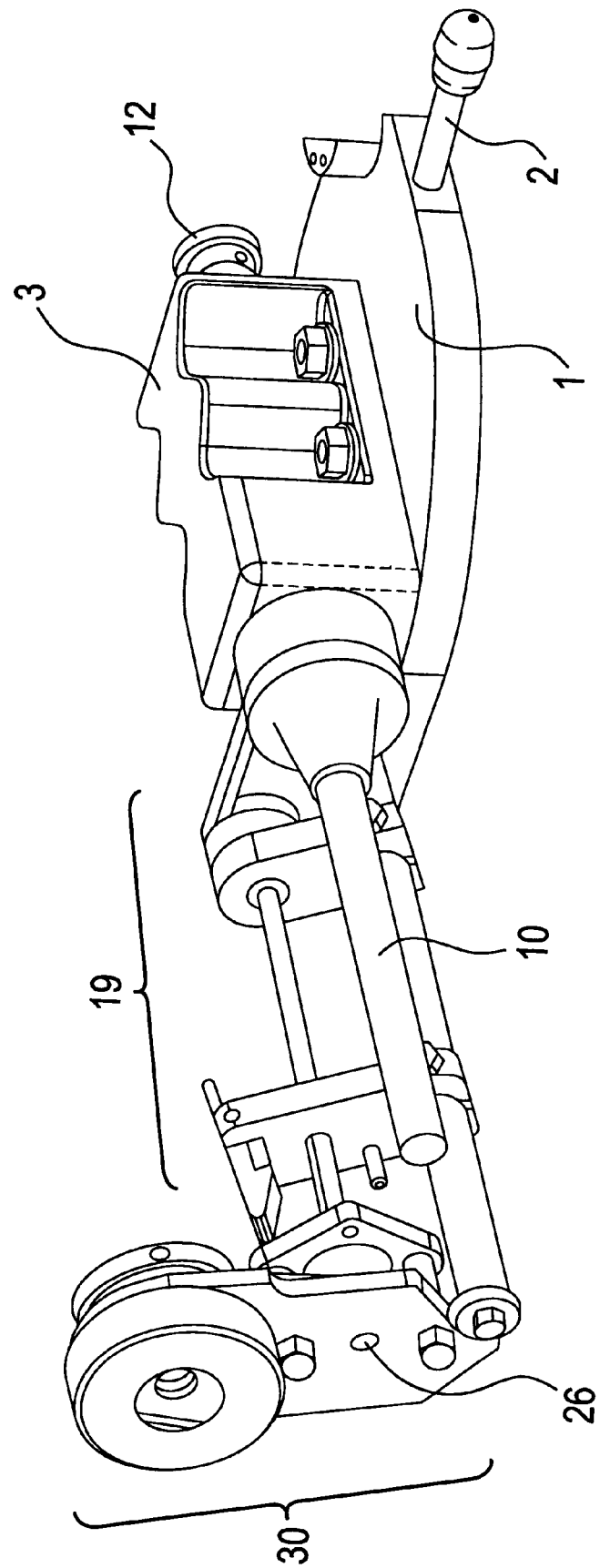
FIG. 1C is a perspective view of a casing lock mechanism of the present invention as attached to a lid of a sausage stuffing machine, but showing a chuck assembly in a position wherein it is pivoted away from an axis of a sausage stuffing nozzle of the sausage stuffing machine.
Figure 4:
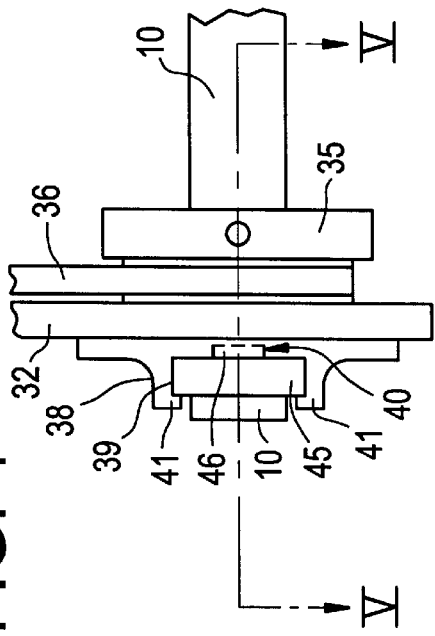
FIG. 4 is a side view of a nozzle and a portion of the chuck assembly in the casing lock mechanism according to the present invention.

Incidentally, the nozzle 10 may be changed simply by removing the special nut 11—which holds the nozzle to the drive rod within the housing chamber 3—after the chuck assembly 38 has been slid along the drive portion 26 of the rotating rod 25 so that the jaw holes 47, 47' are no longer around the nozzle 10. To facilitate replacement of the nozzle 10, the chuck assembly 30 pivots away from the longitudinal axis of the nozzle 10. That is, after being slid along the drive portion 26, the chuck assembly 30 is also pivotable to the position as shown in FIG. 1C, i.e., it is pivoted around the drive portion 26 and away from the longitudinal axis of the nozzle 10, thereby facilitating access to, and removal of, the nozzle 10.

The operation of the casing lock mechanism of the present invention will now be described with reference to FIGS. 1 and 4–6. A sausage casing 50, having a shirred portion 52, is mounted around the nozzle 10 and an end thereof is tied off in front of the discharge end of nozzle 10. The directional control valve operates to deliver hydraulic pressure to the piston (not shown) thereby forcing meat emulsion through the housing chamber 3, and out of the nozzle 10 in the direction of arrow D as shown in FIG. 5. The meat emulsion fills the sausage casing 50 during a period of time as set by the electronic timer (not shown) to form a given length of sausage link while the nozzle 10 remains still, i.e., does not rotate.

Then, after the given time which produces the desired length sausage link, the directional control valve operates to deliver hydraulic pressure to a motor 7 (see FIG. 1A) which drives coupling 12 so as to rotate nozzle 10, and the special nut 11 attached thereto. Through the action of belt 24, pulley 23, rotating rod 25, and driving portion 26, this rotation of the nozzle 10 is imparted to first pulley 34. As first pulley 34 rotates, in the direction shown by arrow A in FIG. 6, for example, belt 36 and second pulley 35 cause chuck member 38 to rotate in the direction of arrow B. Due to the size of the pulleys 23, 34, 35, and the configuration of the chuck member 38, the chuck member 38 rotates at the same time, in the same direction, and at the same speed as, the nozzle 10. The rotation of chuck member 38 thus imparts a centrifugal force to the jaws 45, 45' held therein. Under this centrifugal force, the jaws 45, 45' move in respective directions C, C' so that the jaw holes 47, 47' lock the casing 50 to the nozzle 10 at points 54 for rotation therewith. Hence, because the casing 50 is held to the nozzle 10 as it rotates, a twist point 56 is properly formed between the end of the nozzle 10 and the previously formed sausage 58. For example, the nozzle 10 rotates for about four revolutions (or about .4 seconds) to form the twist point 56. Further, for example, with such a rotation the jaws 45, 45' are designed to produce a force of about eleven ounces against the casing 50 to hold it against the outside surface of the extruding nozzle 10 during the link twisting operation.

Upon completion of the link twisting operation, the nozzle 10 stops rotating and, therefore, the chuck member 38 also stops rotating. When the chuck member 38 stops rotating, centrifugal force is no longer applied to the jaws 45, 45' and, therefore, they are allowed to assume a free state wherein they do not apply appreciable force on the sausage casing 50. That is, in the free state the jaws 45, 45' apply, at most, a force on the sausage casing 50 due to the action of gravity. However, the weights of the jaws 45, 45' are such that this force due to gravity is minimal. Thus, the sausage casing 50 moves freely and easily through the jaws 45, 45' during the extruding cycle, wherein the nozzle 10 does not rotate. Yet the casing lock mechanism of the present invention sufficiently holds the casing 50 when the nozzle 10 does rotate, as during a link twisting operation.

Thus, the present invention provides a simple casing lock mechanism that is automatically activated upon the rotation of the nozzle 10, and is automatically deactivated when the nozzle 10 stops rotating. Thus, the casing lock mechanism of the present invention applies a locking force on the sausage casing 50 only during a link twisting operation and, therefore, reduces the risk of damage to the casing 50 during sausage extrusion.

It is contemplated that numerous modifications may be made to the casing lock mechanism of the present invention without departing from the spirit and scope of the invention as defined in the following claims.

We claim:

1. A sausage stuffing machine comprising:
    a rotatable nozzle having a longitudinal axis and a discharge end which discharges meat emulsion; and
    a casing lock mechanism, disposed adjacent to said discharge end of said rotatable nozzle, including:
        a rotatable chuck member, disposed around the nozzle and including a radial track, said rotatable chuck member being connected to said nozzle so as to rotate in the same direction, and at the same speed, as said nozzle;
        a first jaw member slidingly disposed on said radial track, said first jaw member having an opening at a first end thereof, wherein said opening is sized so as to receive the discharge end of said nozzle therethrough.

2. The sausage stuffing machine according to claim 1, wherein said radial track is disposed substantially perpendicular to said longitudinal axis.

3. The sausage stuffing machine according to claim 1, wherein said rotatable chuck is connected to said nozzle so as to rotate at the same time as said nozzle.

4. The sausage stuffing machine according to claim 1, wherein said casing lock mechanism further includes a second jaw member slidingly disposed on said radial track adjacent to said first jaw member, said second jaw member having an opening at a first end thereof, wherein said second-jaw opening is sized so as to receive the discharge end of said nozzle therethrough.

5. The sausage stuffing machine according to claim 4, wherein said first jaw member includes a second end that is opposite to said first-jaw-member first end and that is heavier than said first-jaw-member first end, and wherein said second jaw member includes a second end that is opposite to said second-jaw-member first end and that is heavier than said second-jaw-member first end, so that said first and second jaw members are centrifugally moved radially outwardly, thereby engaging said nozzle, upon rotation of said chuck member.

6. The sausage stuffing machine according to claim 1, wherein said radial track is bounded by tabs located on an outer periphery of said chuck member so that said first jaw member is removable from said radial track.

7. The sausage stuffing machine according to claim 1, wherein said casing lock mechanism is disposed in a chuck assembly that is slidably connected to a supporting and driving apparatus disposed adjacent to said nozzle.

8. The sausage stuffing machine according to claim 7, wherein
    said supporting and driving apparatus includes a first pulley, said chuck assembly includes a second pulley and a third pulley to which said chuck member is attached,
    further wherein said first pulley is connected to said nozzle so as to be rotatably driven thereby, said second pulley is connected to said first pulley so as to be rotatably driven thereby, and said third pulley is connected to said second pulley so as to be rotatably driven thereby, and
    further wherein said first, second, and third pulleys are sized so that said chuck member rotates at the same speed as said nozzle.

* * * * *